United States Patent [19]

Kimura

[11] Patent Number: 4,566,226
[45] Date of Patent: Jan. 28, 1986

[54] SYSTEM FOR CORRECTING THE POSITION OF A SPINDLE FOR A PROCESSING MACHINE

[75] Inventor: Sosaku Kimura, Tokorozawa, Japan
[73] Assignee: Citizen Watch Co., Ltd., Tokyo, Japan
[21] Appl. No.: 662,675
[22] Filed: Oct. 19, 1984

[30] Foreign Application Priority Data

Oct. 20, 1983 [JP] Japan .................. 58-195269

[51] Int. Cl.⁴ ............................................ B24B 49/12
[52] U.S. Cl. ............................. 51/165.72; 51/165.73; 51/134.5 R; 82/2 B; 408/16
[58] Field of Search ......... 51/165.72, 165.73, 134.5 R; 82/2 B; 408/16

[56] References Cited

U.S. PATENT DOCUMENTS 1,984,121 12/1934 Drescher .................... 51/165.72
4,417,816 11/1983 Kiudl ............................ 82/34 R

FOREIGN PATENT DOCUMENTS 203502 3/1939 Sweden .................. 51/165.73
248883 5/1947 Sweden .................. 408/16
509416 4/1976 U.S.S.R. .................. 51/165.73

OTHER PUBLICATIONS

SPIE vol. 235, Aspheric Optics, Design, Manuf. Testing, Article by Tom G. Gijsbers, "Colath,—Philips Research, pp. 43-49.

Primary Examiner—Harold D. Whitehead
Attorney, Agent, or Firm—Birch, Stewart, Kolasch & Birch

[57] ABSTRACT

A system for correcting the position of a spindle of a processing machine, in which the spindle is rotatably mounted by hydrostatic bearings in a table on a bed and has an axial hole. A reflector is provided in the hole at a tip end portion, an interferometer is provided adjacent the other end of the spindle opposite the reflector, and a laser unit is provided for emitting a laser beam to the reflector and receiving the reflected laser beam through the interferometer and for producing an output signal dependent on the position of the tip end portion. The output signal is compared with a reference value and the spindle is shifted in accordance with the comparison so as to correct the displacement of the tip end of the spindle caused by thermal expansion.

5 Claims, 4 Drawing Figures

SYSTEM FOR CORRECTING THE POSITION OF A SPINDLE FOR A PROCESSING MACHINE

BACKGROUND OF THE INVENTION

The present invention relates to a system for correcting the position of a spindle of a processing machine such as, an engine lathe, a grinding machine and others.

When a spindle of a processing machine is rotated in operation, frictional heat generates in the spindle. Particularly, in the case of the spindle which is supported by hydrostatic bearings, the temperature of lubricating oil in the pockets elevates by friction so that the temperature of the spindle also rises. Therefore, the spindle thermally expands in the axial direction, which causes a positioning error or deviation in distance between a tool and a work.

SUMMARY OF THE INVENTION

The object of the present invention is to provide a system which may precisely correct the positioning error of a spindle caused by thermal expansion.

According to the present invention, there is provided a system for correcting the position for a processing machine having a bed and a holder operatively mounted on the bed comprising, a spindle rotatably mounted by bearings, and having an axial hole and an end portion, first means for changing the relative position of the end portion and the holder, a reflector provided in the hole at the end portion, an interferometer provided adjacent the other end of the spindle opposite the reflector, a laser unit for emitting a laser beam to the reflector and receiving the reflected laser beam through the interferometer and for producing a first output signal dependent on the position of the end portion, comparing means for comparing the first output signal with a reference value and for producing a second output signal dependent on the difference between the first output signal and the reference value, and second means responsive to the second output signal for operating the first means to correct the relative position.

In another aspect of the present invention, the spindle is rotatably mounted by hydrostatic bearings on a table slidably mounted on the bed, and the first means comprises a lead screw for moving the table, a flange formed on the lead screw, and hydrostatic thrust bearings provided on both sides of the flange, and the second means comprises a servo valve responsive to the second output signal for controlling the supply of fluid to the hydrostatic thrust bearings.

In a further aspect of the present invention, the first means comprises a lead screw engaged with the table and a motor for rotating the lead screw, and the second means is a driver for operating the motor.

These and other objects and features of the present invention will become more apparent from the following description with reference to the accompanying drawings.

DESCRIPTION OF THE PREFERRED EMBODIMENTS

Figure 1A:
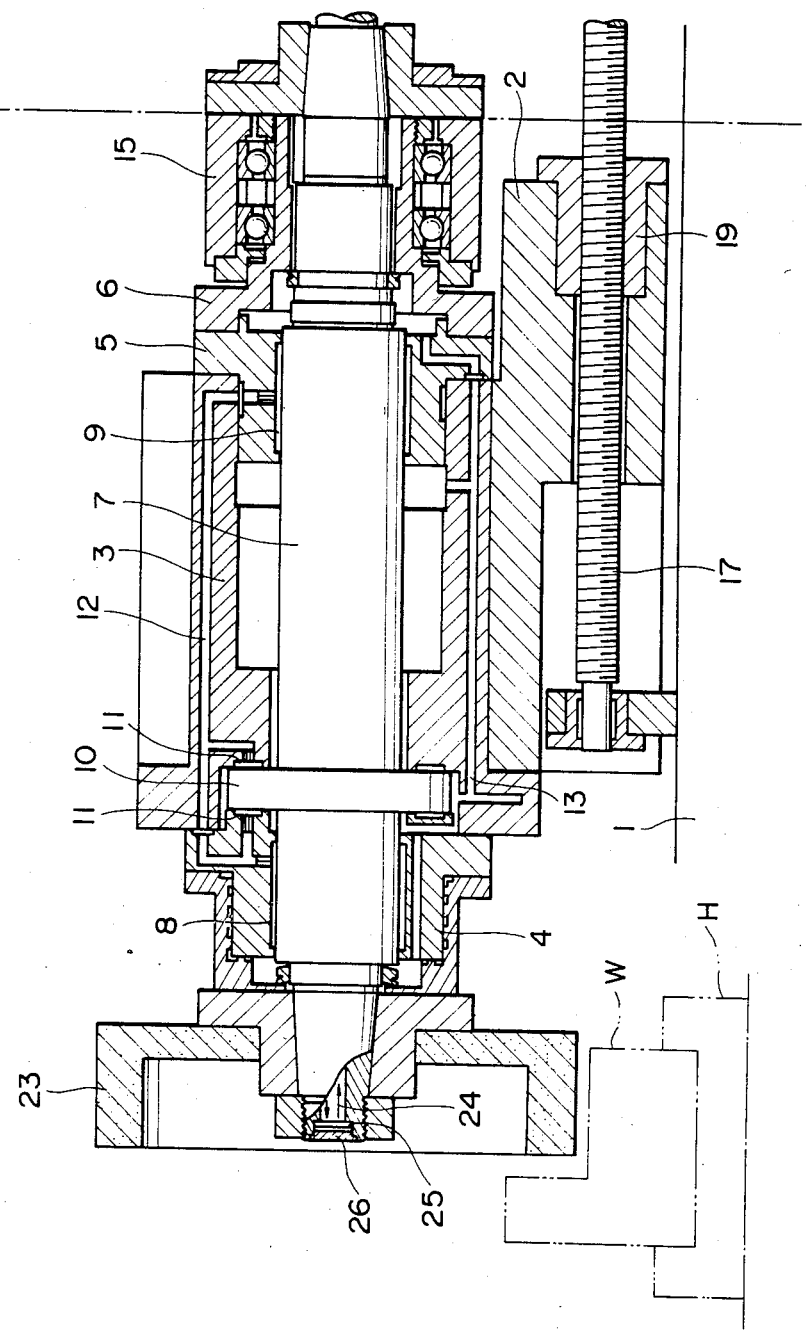
FIGS. 1a and 1b which are broken-away overlapping views together constitute a sectional view of an embodiment according to the present invention.
Figure 1B:
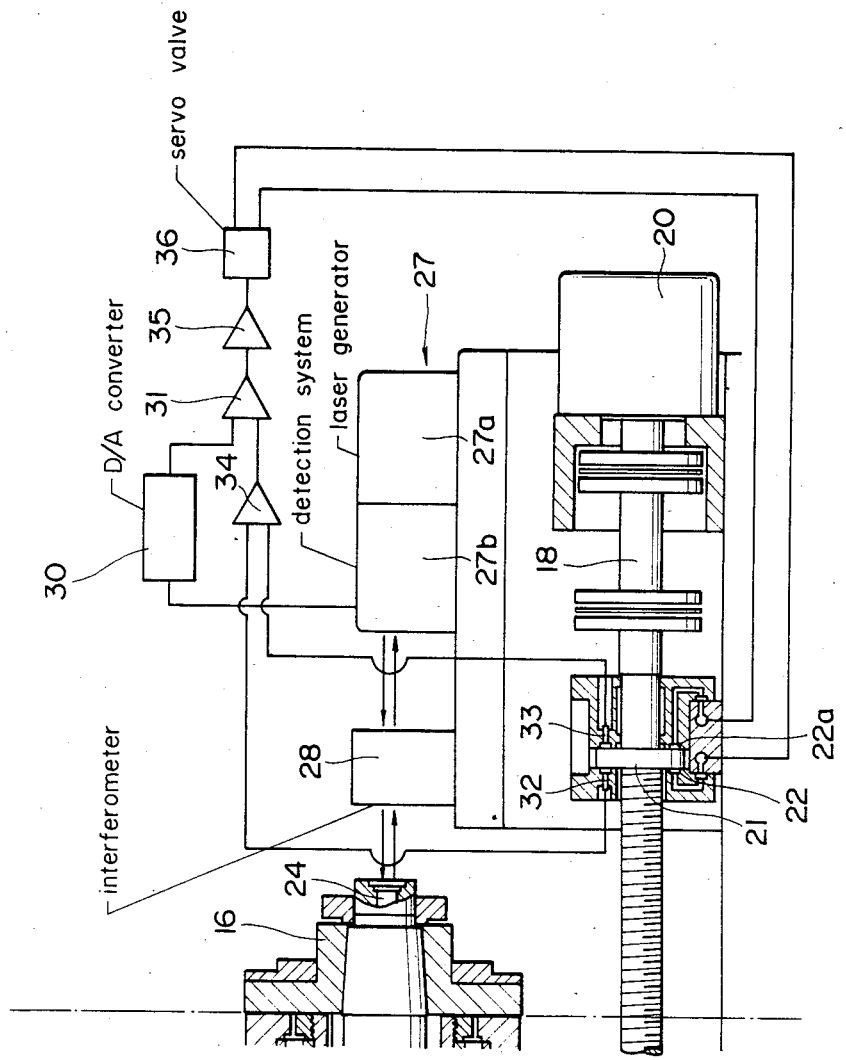

FIGS. 1a and 1b show sectional views of a grinding machine to which the present invention is applied. The grinding machine comprises a bed 1 on which a table 2 serving as a headstock is slidably mounted, and a casing 3 secured to the table 2.

A cylindrical front bearing member 4 is secured to the front end of the casing 3 and a cylindrical rear bearing member 5 is secured to the rear end. Fixed to the rear bearing member 5 is a cylindrical support member 6. A spindle 7 penetrates the bearings 4 and 5, and the support member 6 and is rotatably supported by hydrostatic radial bearings 8 and 9 provided by pockets formed in the bearing members 4 and 5. Hydrostatic thrust bearings 11 are further provided at both sides of a flange 10 formed around the spindle 7. Supply passage 12 and drain passages 13 are formed in casing 3 and bearing members 4 and 5 and arranged to supply oil under pressure to pockets of each of hydrostatic bearings 8, 9 and 11. Overflow oil is returned to an oil reservoir (not shown) through the drain passages 13.

The supporting member 6 on which a pulley 15 is rotatably mounted is connected with the spindle 7 through a connecting member 16 so as to drive the spindle 7 by a belt (not shown) through pulley 15 and connecting member 16.

A lead screw 17 which is engaged with a female screw 19 mounted in the table 2 is connected to a motor 20 through a coupling 18 so as to slide the table 2 by the motor. Formed around the lead screw 17 is a flange 21 both sides of which are supported by hydrostatic thrust bearings 22 and 22a so as to sustain axial load exerted on the lead screw. Secured to the tip of the spindle 7 is a grinding wheel 23. A work W is held by a holder H operatively and securely mounted on the bed 1.

According to the present invention, an axial hold 24 is formed in the spindle 7 and a cap 26 provided with a reflector 25 at the inner side thereof is secured to the spindle at the front end.

Provided at the rear end of the spindle is a laser unit 27 comprising a laser generator 27a and detection system 27b. A laser beam emitted from the laser generator passes through an interferometer 28 and is reflected back by the reflector 25. The laser unit 27 and interferometer 28 are well known devices, and the detection system 27b detects the interference pattern made by the interferometer 28 dependent on the position of the spindle tip to produce a digital output. The digital output of the laser unit 27 is converted to an analog signal by a digital-to-analog (D/A) converter 30, the output of which is applied to one of input terminals of a comparator 31.

On the other hand, pressure gauges 32, 33 are provided at pockets of the thrust bearings 22, 22a, respectively. The output signals of the pressure gauges 32, 33 are applied to a comparator 34 to get the difference between static pressures in both bearings 22 and 22a. The output of the comparator 34 is applied to the other input terminal of the comparator 31.

The compartor 31 operates to compare the output signal of D/A converter 30, which represents the position of the tip of the spindle 7, with the difference between static pressures in both thrust bearings 22 and 22a. If the tip of the spindle 7 is displaced by the variation of the temperature of the spindle, the output of the comparator 31 varies in dependence on the change of the position. The output of the comparator 31 is applied to a servo valve 36 through a servo amplifier 35. The servo valve 36 accordingly operates to control the volume of the oil fed to the pockets of thrust bearings 22 and 22a so that the lead screw 17 is shifted in the axial direction. Therefore, the spindle 7 is moved so as to correct the position error caused by thermal expansion.

Figure 2A:
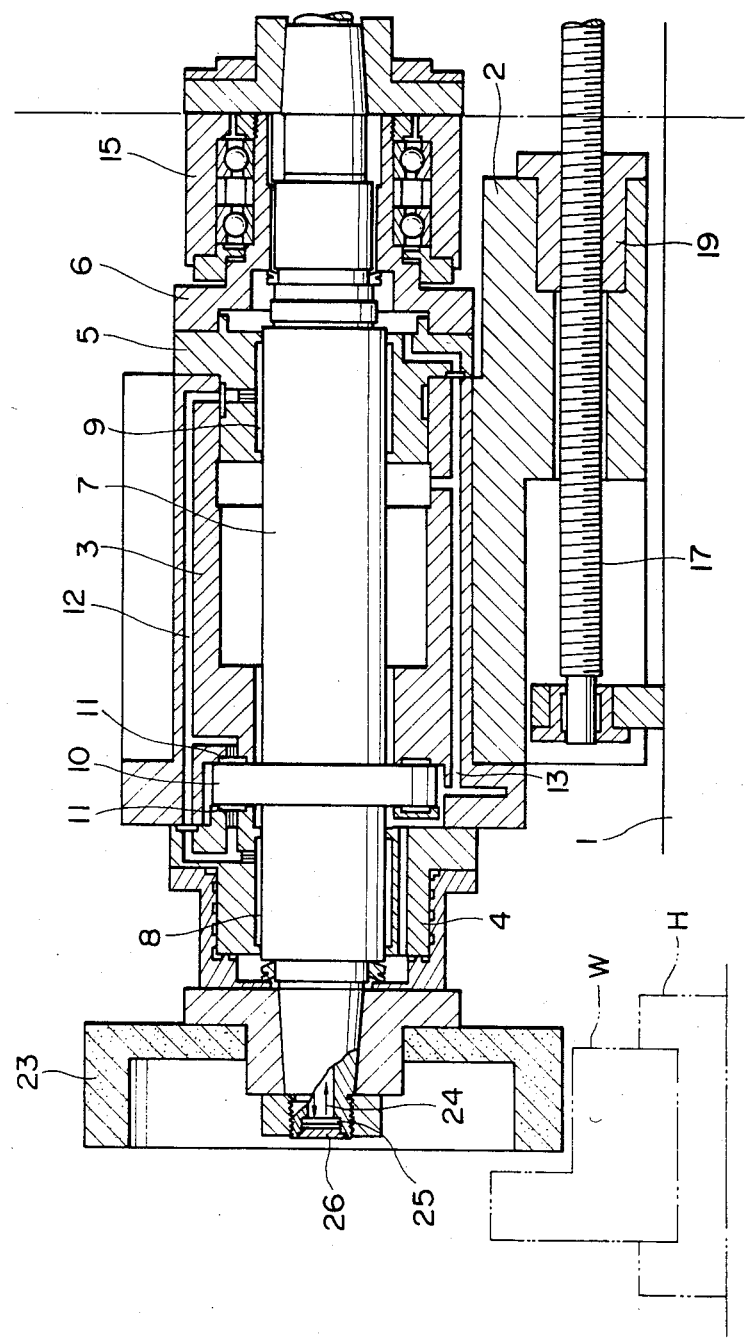
FIGS. 2a and 2b are sectional views showing another embodiment of the present invention.
Figure 2B:
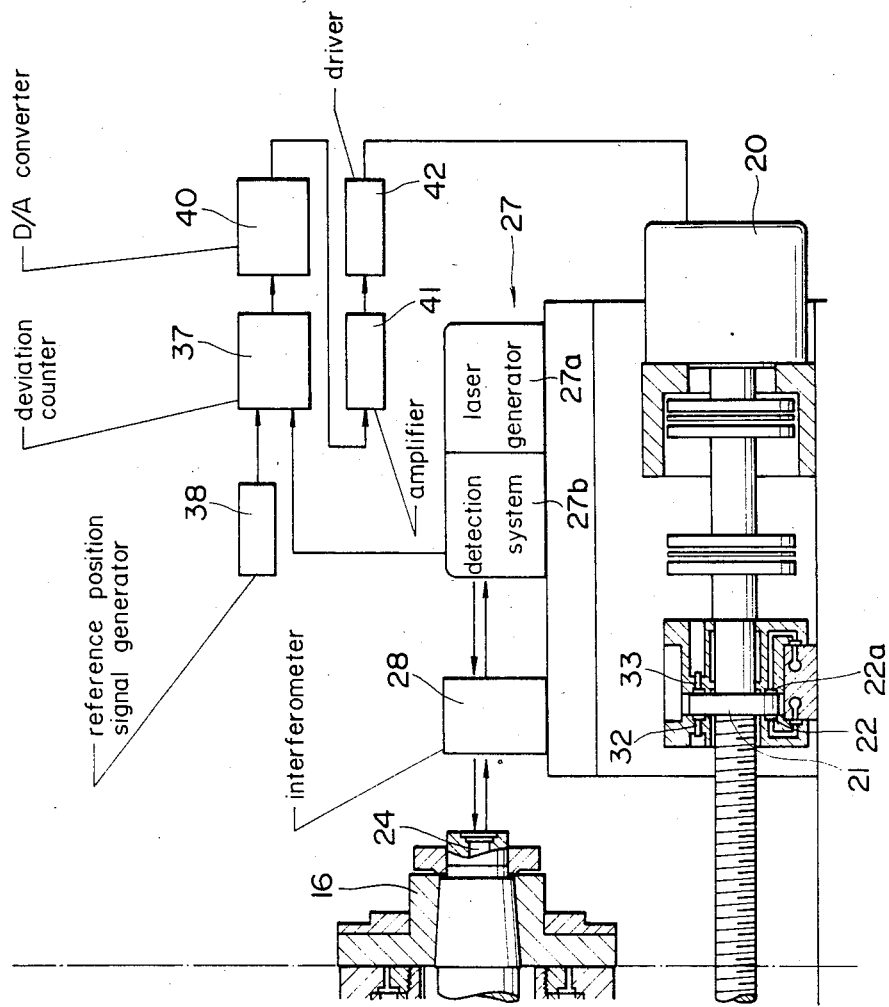

FIGS. 2a and 2b show another embodiment of the present invention. In the present embodiment, the digital output of the laser unit 27 is applied to a deviation counter 37 which operates to compare the input signal with a reference signal from a reference position signal generator 38 to produce a spindle position deviation signal.

The spindle position deviation signal is converted to an analog signal by a D/A converter 40, output of which is fed to the motor 20 through an amplifier 41 and a driver 42. Accordingly, the lead screw 17 is rotated to slide the table 2, so that the position of the tip of the spindle 7 can be corrected. Other constructions are identical to those of the first embodiment. Like numerals of reference designate like parts in views showing the two embodiments.

Although the spindle is moved to correct positioning error in the above described embodiments, the system of the invention may be modified to slide the holding device H for holding the work W in order to correct the deviation of the spindle.

From the foregoing, it will be understood that the present invention provides a correcting system in which the end position of a spindle is accurately measured by a laser beam passing through the axial hole of the spindle, so that precise error correction of the position can be accomplished.

When the present invention is applied to a lathe, the grinding wheel 23 is substituted with a work and the work W and holding device H are substituted with a tool and a tool holder operatively mounted on the bed 1.

While the invention has been described in conjunction with preferred specific embodiments thereof, it will be understood that this description is intended to illustrate and not limit the scope of the invention, which is defined by the following claims.

What is claimed is:

1. a system for correcting the position for a processing machine having a bed and a holder operatively mounted on the bed, comprising:
    a spindle rotatably mounted by bearings, and having an axial hole and an end portion;
    first means for changing the relative position of said end portion and said holder;
    a reflector provided in said hole at the end portion;
    an interferometer provided adjacent the other end of said spindle opposite the reflector;
    a laser unit for emitting a laser beam to said reflector and receiving the reflected laser beam through said interferometer and for producing a first output signal dependent on the position of said end potion;
    comparing means for comparing said first output signal with a reference value and for producing a second output signal dependent on the difference between said first output signal and said reference value; and
    second means responsive to said second output signal for operating said first means to correct the relative position.

2. The system for correcting the position for a processing machine according to claim 1 wherein said spindle is rotatably mounted by hydrostatic bearings.

3. The system for correcting the position for a processing machine according to claim 1 where said first means comprises a lead screw, a flange formed on said lead screw, and hydrostatic thrust bearings provided on both sides of said flange, said second means comprises a servo valve responsive to said second output signal for controlling the supply of fluid to said hydrostatic thrust bearings.

4. The system for correcting the position for a processing machine according to claim 1 wherein said first means comprises a lead screw and a motor for rotating the lead screw, and said second means is a driver for operating said motor.

5. The system for correcting the position for a processing machine according to claim 3 wherein said spindle is provided in a table slidably mounted on said bed and said lead screw is engaged with said table so as to move the table by rotating the lead screw.

* * * * *